3,051,701
BENZODIAZEPINE COMPOUNDS

Earl Reeder, Nutley, and Leo Henryk Sternbach, Upper Montclair, N.J., assignors to Hoffmann-La Roche Inc., Roche Park, Nutley, N.J., a corporation of New Jersey
No Drawing. Filed Dec. 10, 1959, Ser. No. 858,597
8 Claims. (Cl. 260—239)

This invention relates to benzodiazepine compounds, particularly those which are represented by the structural formula

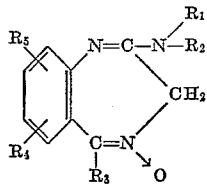

wherein:

$R_1$ represents lower alkanoyl, cyanoethyl, carboxyethyl, carbo-lower alkoxyethyl, or alkali metal carboxyethyl,
$R_2$ represents hydrogen or lower alkyl,
$R_3$ represents phenyl, halophenyl, lower alkylphenyl or lower alkoxyphenyl, $R_4$ and $R_5$ each represents hydrogen, halogen or lower alkyl.

The compounds having the formula above are useful as sedatives, muscle relaxants or anticonvulsants. Those compounds wherein $R_1$ represents a lower alkanoyl group are of particular utility since they are tasteless in contrast to other substances of this type which are characterized by a bitter taste. Thus, these particular compounds are especially useful in oral preparations when palatability is an important consideration. They constitute a preferred group within the class encompassed by the structural formula.

In the structural formula, the lower alkyl groups include saturated straight chain and branched chain aliphatic hydrocarbon radicals such as methyl, ethyl, propyl, isopropyl, butyl, isobutyl, amyl, hexyl and the like. Such groups are contemplated in the alkyl substituents represents by $R_2$, $R_4$ and $R_5$, in the alkyl-substituted phenyl and alkoxy-substituted phenyl groups represented by $R_3$, as well as the ester groups represented by $R_1$ which are derived from lower fatty (alkanoic) acids. Chlorine and bromine are preferred among the halogens in the groups represented by $R_3$, $R_4$ and $R_5$.

The compounds of this invention are produced from halo- or alkyl-substituted 2-aminobenzophenones which are first converted to their oximes with hydroxylamines or a hydroxylamine salt in a medium such as ethanol and then treated with an α-haloacyl halide, in glacial acetic acid for example, to obtain the 2-haloalkylquinazoline-3-oxide bearing the same substituents as the original benzophenone. The quinazoline 3-oxide undergoes rearrangement and enlargement of the heterocyclic ring upon treatment with ammonia or an alkylamine in an inert solvent at room temperature to obtain a 3H-1,4-benzodiazepine 4-oxide with the same substituent groups as before and an amino or alkylamino group as a 2-substituent. By reacting the 3H-1,4-benzodiazepine 4-oxide with acrylonitrile or an alkyl acrylate such as ethyl acrylate in a solvent such as dimethylformamide, ether, dioxane, lower alkanols, etc., or with an acid anhydride or acid halide, such as acetic anhydride or acetyl chloride, in a tertiary base such as pyridine, then the cyanoethyl, carbo-lower alkoxyethyl or lower alkanoyl group, respectively, is introduced onto the nitrogen attached to the carbon atom in the 2-position.

Compounds of the above description which are basic in character, i.e. wherein $R_1$ represents cyanoethyl, carboxyethyl and carbo-lower alkoxyethyl, form acid addition salts by reaction of the benzodiazepine base with an acid such as the mineral acids. Such acid salts as the hydrohalides, e.g. hydrochloride, hydrobromide, and the like, phosphate, sulfate, etc. are also within the scope of the invention.

The compounds of the invention may be utilized by administering a therapeutic dosage (adjusted to route of administration and individual requirements) either orally as a base or salt or parenterally as a soluble salt. Either the base or a medicinally acceptable acid addition salt thereof may be incorporated in a liquid or solid dosage form such as injectables, elixirs, capsules, lozenges, tablets, etc., along with the appropriate liquid or solid vehicles, excipients or carriers according to conventional pharmaceutical practice.

Certain of the intermediates which are used in the production of the compounds of the formula above are novel. The method of producing such compounds is evident from the working examples which disclose their synthesis in detail.

The following examples are illustrative of the invention. All temperatures are expressed in degrees centigrade and the melting points are corrected.

Example 1

To a solution of 20 g. of 7-chloro-2-methylamino-5-phenyl-3H-1,4-benzodiazepine 4-oxide in 100 ml. of dimethylformamide were added 6 ml. of acrylonitrile and ½ ml. of Triton B (trimethylbenzylammonium hydroxide). The mixture was initially cooled, then left at room temperature for 20 minutes, diluted with ice and 3 N hydrochloric acid and extracted with ether. The acidic aqueous solution was made alkaline with dilute sodium hydroxide and the precipitated reaction product was extracted with ether. This ether solution was dried, concentrated partly in vacuo and the precipitated reaction product was filtered off. On further concentration, additional amounts of the product were obtained. The 7-chloro-2-(N-methyl-2-cyanoethylamino)-5-phenyl-3H - 1, 4-benzodiazepine 4-oxide was crystallized from ether and dried at 80° under high vacuum to obtain a solvent free powder melting at 155–156°.

To a suspension of 10 g. of the base obtained above in methanol was added an equimolar amount of 7 N methanolic hydrochloric acid. The solution was filtered and the product precipitated by the addition of ether. After recrystallization from a mixture of methanol and ether, the 7-chloro-2-(N-methyl-2-cyanoethylamino) - 5-phenyl-3H-1,4-benzodiazepine 4-oxide hydrochloride was obtained in the form of colorless prisms, M.P. 172–173°.

Example 2

18 ml. of ethyl acrylate and 1.8 ml. of Triton B were added to a solution of 54 g. of 7-chloro-2-methylamino-5-phenyl-3H-1,4-benzodiazepine 4-oxide in 270 ml. of dimethylformamide. The mixture was initially cooled with ice, then stirred at room temperature for 25 minutes. It was then diluted with ice and 3 N hydrochloric acid and extracted with ether. The aqueous solution was made alkaline and the reaction product was extracted with methylene chloride. The methylene chloride solution was dried and concentrated in vacuo. The product was crystallized by the addition of ether and filtered off, then recrystallized from a mixture of methylene chloride, ether and petroleum ether. The 7-chloro-2-(N-methyl-2-carbethoxyethylamino)-5-phenyl - 3H - 1,4 - benzodiazepine 4-oxide formed colorless prisms, M.P. 149–150°.

The base obtained above was suspended in alcohol and an equimolar amount of 7 N methanolic hydrochloric acid was added. The mixture was concentrated in vacuo and the crystalline residue was filtered off and recrystallized from a mixture of methanol and ether. The 7-chloro-2-(N - methyl - 2 - carbethoxyethylamino)-5-phenyl-3H-1,4-benzodiazepine 4-oxide hydrochloride formed colorless prisms melting at 186–187°.

Example 3

100 ml. of 1 N sodium hydroxide were added to a solution of 40 g. (0.1 mol) of 7-chloro-2-(N-methyl-2-carbethoxyethylamino)-5-phenyl - 3H - 1,4 - benzodiazepine 4-oxide in 250 ml. of dioxane. The mixture was left at room temperature for 20 minutes and then concentrated to dryness in vacuo. The residue was suspended in methanol and filtered. The product was recrystallized from a mixture of methanol, ether and petroleum ether to obtain fine yellowish needles of 7-chloro-2-(N-methyl-2-carboxyethylamino)-5-phenyl-3H-1,4-benzodiazepine 4-oxide sodium salt hydrate, M.P. 204–205°.

To an ice cold aqueous solution of the above sodium salt, 1 mol of 1 N hydrochloric acid was added. The free acid was extracted with ether and crystallized by partial concentration and addition of petroleum ether. The product, 7-chloro-2-(N-methyl-2-carboxyethylamino)-5-phenyl-3H-1,4-benzodiazepine 4-oxide, formed yellow prisms melting at 206.5–207.5°.

Example 4

600 ml. of acetic anhydride were added to a solution of 100 g. of 7-chloro-2-methylamino-5-phenyl-3H-1,4-benzodiazepine 4-oxide in 1.2 liters of dry pyridine. The mixture was left at room temperature for 14 hours and then concentrated in vacuo. The residue was crystallized from a mixture of ether and petroleum ether to obtain 7-chloro-2-(N - methylacetamido)-5-phenyl-3H-1,4-benzodiazepine 4-oxide in the form of colorless prisms, M.P. 186–187°.

Example 5

120 ml. of propionic anhydride were added to a solution of 20 g. of 7-chloro-2-methylamino-5-phenyl-3H-1,4-benzodiazepine 4-oxide in 240 ml. of pyridine. The mixture was left at room temperature for 14 hours and then concentrated in vacuo. The residue was crystallized from a mixture of methylene chloride and acetone. The product, 7-chloro - 2 - (N-methylpropionamido)-5-phenyl-3H-1,4-benzodiazepine 4-oxide, was obtained in the form of colorless prisms, melting at 213–214°.

Example 6

3 ml. of butyryl chloride were added to a solution of 6 g. of 7-chloro-2-methylamino-5-phenyl-3H-1,4-benzodiazepine 4-oxide and 75 ml. of pyridine. The mixture was left at room temperature for 14 hours and then concentrated in vacuo. The residue was dissolved in methylene chloride and the solution was washed with ice cold 3 N hydrochloric acid, ice cold sodium carbonate solution and ice water. The organic solution was dried and concentrated in vacuo. The residue was crystallized from ether forming colorless prisms of 7-chloro-2-(N-methylbutyramido) - 5 - phenyl-3H-1,4-benzodiazepine 4-oxide, M.P. 169–170°.

Example 7

12 ml. of acetic anhydride were added to a solution of 0.45 g. of 7-chloro-2-amino-5-phenyl-3H-1,4-benzodiazepine 4-oxide in 12 ml. of pyridine. The precipitated crystalline product was filtered off after 2 hours and purified by dissolving in warm pyridine and reprecipitating with acetic anhydride. The pure 7-chloro-2-acetamido-5-phenyl-3H-1,4-benzodiazepine 4-oxide formed fine white needles melting at 243–244°.

Example 8

20 ml. of acetic anhydride were added to a solution of 3.9 g. of 7,8-dimethyl-2-methylamino-5-phenyl-3H-1,4-benzodiazepine 4-oxide in 20 ml. of pyridine. The solution was left at room temperature for 20 hours and then concentrated in vacuo. The residue was crystallized from a mixture of acetone and ether to obtain 7,8-dimethyl-2-(N-methylacetamido) - 5 - phenyl-3H-1,4-benzodiazepine 4-oxide in the form of colorless prisms melting at 193–194°, with dec.

Example 9

A solution of 2.6 g. of 7-bromo-2-amino-5-phenyl-3H-1,4-benzodiazepine 4-oxide in a mixture of 50 ml. of pyridine and 30 ml. of acetic anhydride was heated slightly, then left at room temperature for 20 hours. The precipitated crystals were filtered off and dissolved again in 150 ml. of pyridine. After the addition of 30 ml. of acetic anhydride, the solution was left at room temperature for 15 hours. The precipitated crystals were filtered off and recrystallized from dioxane. The pure 7-bromo-2-acetamido-5-phenyl - 3H - 1,4 - benzodiazepine 4-oxide formed colorless needles melting at 248–249°.

Example 10

20 ml. of acetic anhydride were added to a solution of 3.8 g. of 7-methyl-2-methylamino-5-phenyl-3H-1,4-benzodiazepine 4-oxide in 20 ml. of pyridine. The solution was left at room temperature for 20 hours and then concentrated in vacuo. The residue was dissolved in methylene chloride and washed with ice cold dilute alkali. The organic layer was dried, concentrated in vacuo and the residue was crystallized from acetone. The product, 7-methyl - 2 - (N - methylacetamido) - 5 - phenyl-3H,1,4-benzodiazepine 4-oxide, formed colorless prisms melting at 205–206°.

Example 11

20 ml. of acetic anhydride were added to a solution of 4 g. of 2-methylamino-5-(4-methoxyphenyl)-3H-1,4-benzodiazepine 4-oxide in 20 ml. of pyridine. The mixture was left at room temperature for 14 hours and then concentrated in vacuo. The residue was dissolved in methylene chloride and the solution was washed with ice cold 3 N hydrochloric acid, ice cold sodium carbonate solution and ice water. The organic solution was dried and concentrated in vacuo. The residue was crystallized from acetone to obtain 5-(4-methoxyphenyl)-2-(N-methylacetamido)-3H-1,4-benzodiazepine 4-oxide in the form of colorless prisms melting at 181–182°.

Example 12

To 500 g. of molten p-chloroaniline heated to 120° were added with stirring 750 ml. of p-chlorobenzoyl chloride, causing a violent evolution of hydrogen chloride. The mixture solidified and was molten by heating to 200°. At this temperature, 500 g. of anhydrous zinc chloride were introduced. The stirring was continued and the mixture was heated at 230–242° for 2 hours. It was then poured into one liter of 0.5 N hydrochloric acid. The precipitated solid was filtered off, pulverized, suspended in one liter of 0.5 N hydrochloric acid and refluxed for one hour. The mixture was then cooled. The resinous material was filtered off and dissolved in a mixture of 14 liters of acetic acid and 3 liters of concentrated hydrochloric acid. The solution was refluxed for 18 hours and concentrated in vacuo. The residue was dissolved in 4 liters of benzene and stirred with an excess of alkali. The precipitated sodium p-chlorobenzoate was filtered off and the aqueous layer was discarded. The benzene layer was washed with 2 N sodium hydroxide and then with an excess of 2 N hydrochloric acid. The benzene layer was dried and concentrated to obtain the crude product. The 2-amino-5,4'-dichlorobenzophenone was crystallized from alcohol to obtain yellow needles melting at 118–119°.

A solution of 169 g. of 2-amino-5,4'-dichlorobenzophenone and 73 g. of hydroxylamine hydrochloride in 730 ml. of alcohol was refluxed for 16 hours. The solution was concentrated in vacuo. The residue was diluted with water and ether and neutralized with 40% sodium hydroxide. The ether layer was separated, dried with sodium sulfate and concentrated in vacuo. The residue was dissolved in 100 ml. of benzene and crystallized by the gradual addition of about 2 liters of petroleum ether. The crystalline mixture was cooled for 14 hours at 5°. The precipitated crude 2-amino-5,4'-dichlorobenzophenone oxime was dissolved in 900 ml. of boiling benzene and treated with charcoal. The hot mixture was filtered and the oxime was crystallized by the addition of 1 liter of petroleum ether. After crystallization from a mixture of benzene and petroleum ether, the pure 2-amino-5,4'-dichlorobenzophenone α-oxime was obtained in the form of colorless prisms, melting at 151–154°.

15 ml. of chloracetyl chloride were added over a period of ½ hour to a 50° solution of 28 g. of 2-amino-5,4'-dichlorobenzophenone α-oxime in 250 ml. of glacial acetic acid. The mixture was left at room temperature for 14 hours and then concentrated in vacuo. The residue was dissolved in hot methylene chloride and washed with ice cold sodium hydroxide and water. The organic layer was separated, dried and concentrated in vacuo to about 300 ml. It was then diluted with 600 ml. of petroleum ether and cooled. The reaction product, 6-chloro-2-chloromethyl-4-(4-chlorophenyl)-quinazoline 3-oxide, crystallized in fine yellow needles melting at 163–164°.

27 g. of 6-chloro-2-chloromethyl-4-(4-chlorophenyl)-quinazoline 3-oxide were added in portions at 0° to 150 ml. of a 50% solution of methylamine in methanol. The reaction mixture was stirred at room temperature for 19 hours, then cooled to 5° for 6 hours and filtered. The reaction product remaining on the filter was recrystallized from ethanol to obtain yellow prisms of 7-chloro-2-methylamino-5-(4-chlorophenyl) - 3H - 1,4 - benzodiazepine 4-oxide melting at 254–255°.

40 ml. of acetic anhydride were added at room temperature to a solution of 6 g. of 7-chloro-2-methylamino-5-(4-chlorophenyl)-3H-1,4-benzodiazepine 4-oxide in 50 ml. of pyridine. After 15 hours, a small amount of starting material which had precipitated out was filtered off. The solution was then concentrated in vacuo to a small volume, diluted with methylene chloride and washed with ice cold dilute sodium hydroxide and acid. The methylene chloride solution was then dried, concentrated in vacuo and the residue crystallized from acetone. The product, 7 - chloro-2-(N-methylacetamido)-5-(4-chlorophenyl)-3H-1,4-benzodiazepine 4-oxide, formed colorless plates melting at 191–192°.

*Example 13*

To 995 g. of p-toluoyl chloride were added at 120° with stirring, 500 g. of p-bromoaniline, causing a strong evolution of hydrogen chloride. The mixture solidified and was molten by heating to 200°. 500 g. of anhydrous zinc chloride were added with stirring causing again the evolution of hydrogen chloride. The mixture was heated for 2 hours to 230° and then poured with stirring into 2 liters of 0.5 N hydrochloric acid. The precipitated solid was filtered off, pulverized, suspended in 4 liters of 0.5 N hydrochloric acid and refluxed for one hour. The mixture was cooled. The wet resinous material was filtered off and dissolved in a mixture of 1.5 liters of acetic acid and 0.75 liter of concentrated hydrochloric acid. The solution was refluxed for 18 hours and concentrated in vacuo. To the residue were added 3 liters of benzene and an excess of sodium hydroxide. The precipitated p-toluic acid sodium salt was filtered off and the aqueous layer discarded. The benzene layer was washed with 2 N sodium hydroxide and then with an excess of 2 N hydrochloric acid. The benzene layer was dried and concentrated, yielding crude 2-amino-5-bromo-4'-methylbenzophenone. After crystallization from a mixture of benzene and petroleum ether, the product formed yellow plates melting at 105–106°.

A mixture of 50 g. of 2-amino-5-bromo-4'-methylbenzophenone, 28 g. of hydroxylamine hydrochloride and 250 ml. of alcohol was refluxed for 15 hours. The solution was neutralized with aqueous sodium carbonate, diluted with 100 ml. of water and 100 ml. of benzene. The precipitated crystals of 2-amino-5-bromo-4'-methylbenzophenone α-oxime were filtered off. The benzene layer was separated, dried and partly concentrated in vacuo yielding an additional quantity of the product. The mother liquors were diluted with petroleum ether to obtain 2 - amino - 5 - bromo - 4' - methylbenzophenone β-oxime. The α-oxime was crystallized from ether and melted at 204–205°. The β-oxime was crystallized from a mixture of benzene and petroleum ether and melted at 115–116°.

Into a stirred, cooled solution (10–15°) of 9.15 g. of 2-amino-5-bromo-4'-methylbenzophenone α-oxime in 45 ml. of dioxane were introduced in small portions 3 ml. of chloracetyl chloride and 13.5 ml. of 3 N sodium hydroxide. The chloracetyl chloride and sodium hydroxide were added alternately at a rate so as to keep the temperature below 15° and the mixture neutral or slightly alkaline. After 30 minutes, the mixture was acidified to pH 5 with acetic acid, diluted with water and extracted with ether. The ether extract was dried, concentrated in vacuo and the oily residue was crystallized by the addition of ether. The product, 2-chloracetamido-5-bromo-4'-methylbenzophenone α-oxime, crystallized from dioxane in the form of colorless prisms melting at 179–180°.

A solution of 3 g. of 2-chloracetamido-5-bromo-4'-methylbenzophenone oxime in 25 ml. of boiling acetic anhydride was cooled to 75° and saturated with hydrogen chloride. The mixture was left at room temperature for 30 minutes, heated again for 2 hours at 75°, saturated again with hydrogen chloride and concentrated in vacuo. The residue was crystallized from a mixture of methylene chloride and petroleum ether forming yellow needles of 6-bromo-2-chloromethyl-4-(p-tolyl)-quinazoline 3-oxide, melting at 162–164°.

20 g. of 6-bromo-2-chloromethyl-4-(p-tolyl)-quinazoline 3-oxide were added in portions at 0° to 150 ml. of a 50% solution of methylamine in methanol. The reaction mixture was stirred at room temperature for one hour then cooled to 5° and filtered. The reaction product remaining on the filter, 7-bromo-2-methylamino-5-(p-tolyl)-3H-1,4-benzodiazepine 4-oxide, was recrystallized from ethanol forming yellow prisms melting at 255–256°.

A solution of 3 g. of 7-bromo-2-methylamino-5-(p-tolyl)-3H-1,4-benzodiazepine 4-oxide in a mixture of 16 ml. of pyridine and 16 ml. of acetic anhydride was left at room temperature for 16 hours. The precipitated starting material was filtered off and the mother liquors were concentrated in vacuo. The residue was crystallized by the addition of ether, petroleum ether and acetone. After recrystallization from a mixture of acetone and petroleum ether, the product, 7-bromo-2-(N-methylacetamido)-5-(p-tolyl)-3H-1,4 - benzodiazepine 4-oxide, formed colorless needles melting at 209–210°.

*Example 14*

A solution of 60.2 g. of 2-acetamino-5-chlorobenzophenone in a mixture of 137 ml. of acetic acid and 82 ml. of nitric acid was saturated with hydrogen chloride. The mixture was left at room temperature for one hour and then diluted with water and extracted with methylene chloride. The methylene chloride solution was washed with water, dried and concentrated in vacuo. The residue was dissolved in ether and crystallized by the addition of petroleum ether to obtain colorless prisms of 2-acetamino-3,5-dichlorobenzophenone melting at 143–144°.

A mixture of 72 g. of 2-acetamino-3,5-dichlorobenzophenone, 600 ml. of alcohol and 600 ml. of concentrated hydrochloric acid was refluxed for 3 hours, then diluted with ice, made alkaline with sodium hydroxide and extracted with ether. The ether solution was dried and concentrated. The product, 2-amino-3,5-dichlorobenzophenone, was crystallized from a mixture of ether and petroleum ether forming yellow prisms melting at 93–94°.

2-amino-3,5-dichlorobenzophenone was also produced from benzoyl chloride and 2,4-dichloroaniline. 150 ml. of benzoyl chloride were introduced at 120° with stirring into 100 g. of 2,4-dichloroaniline. The temperature was elevated to 180° and 100 g. of anhydrous zinc chloride were added. The melt was heated at 230–242° for 2 hours and then poured into 250 ml. of 1 N hydrochloric acid. The mixture was refluxed and cooled. The resinous material was separated and dissolved in a mixture of 600 ml. of acetic acid and 1.2 liters of 70% (by volume) sulfuric acid. The solution was refluxed for 3 hours, cooled, made alkaline with 50% potassium hydroxide, then extracted with ether. The aqueous layer was discarded and the ether layer was washed with an excess of 2 N hydrochloric acid. The ether layer was then dried and concentrated. The product was crystalized from petroleum ether.

A mixture of 61.2 g. of 2-amino-3,5-dichlorobenzophenone, 72 g. of hydroxylamine hydrochloride, 200 ml. of pyridine and 600 ml. of alcohol was refluxed for 24 hours and then concentrated in vacuo with the addition of water in order to remove all the pyridine. The residue was dissolved in a mixture of ether and water. The ether solution was washed several times with water, dried and concentrated in vacuo. The residue was dissolved in ether and treated with petroleum ether. The precipitated 2-amino-3,5-dichlorobenzophenone α-oxime was crystallized from dilute alcohol and melted at 126–127°. On partial concentration the mother liquors yielded an additional crop of crystals melting at 94–98°. Fractional crystallization of this mixture from ether with the addition of petroleum ether yielded yellow needles of 2-amino-3,5-dichlorobenzophenone β-oxime melting at 122–123°. The two oximes give a mixed melting point depression.

To a warm solution of 33.7 g. of 2-amino-3,5-dichlorobenzophenone α-oxime in 150 ml. of glacial acetic acid were added 19.5 ml. of chloracetyl chloride. The mixture was left for 18 hours at room temperature, then concentrated in vacuo. The residue was dissolved in methylene chloride, washed with ice water and sodium hydroxide. The methylene chloride solution was then dried, partly concentrated in vacuo and diluted with petroleum ether. 6,8-dichloro-2-chloromethyl-4-phenyl-quinazoline 3-oxide crystallized from this mixture and after recrystallization from the same mixture of solvents melted at 185–186°.

15.6 g. of 6,8-dichloro-2-chloromethyl-4-phenylquinazoline 3-oxide were added with stirring to 150 ml. of 30% methylamine in methanol. The material went into solution and after a short time the reaction product precipitated in almost colorless crystals. It was filtered off after 1½ hours and recrystallized from methanol. The 7,9-dichloro-2-methylamino-5-phenyl-3H-1,4-benzodiazepine 4-oxide melted at 251–252°.

Acetylation with acetic anhydride as described in Example 13 yields 7,9-dichloro-2-(N-methylacetamido)-5-phenyl-3H-,1,4-benzaodiazepine 4-oxide.

*Example 15*

A suspension for oral administration containing 15 mg. per ml. of 7-chloro-2-(N-methylacetamido)-5-phenyl-3H-1,4-benzodiazepine 4-oxide was prepared by homogenizing said compound with a base having the following composition. All proportions are weight/volume except where otherwise indicated.

| | |
|---|---|
| Mono basic sodium phosphate | 0.01 molar %. |
| Sucrose | 57.5%. |
| Carbapol 934 (a carboxy vinyl polymer suspending agent) | 0.2%. |
| Krist-O-Kleer (invert sugar, 60%) | 6.5%. |
| Nipagin | 0.09%. |
| Nipasol | 0.01%. |
| Sodium sucaryl (sodium cyclohexyl sulfamate) | 0.4%. |
| Citric acid | 0.04%. |
| Sodium citrate | 0.06%. |
| F.D.C. Red No. 4 | 0.005%. |

Sodium hydroxide q.s., pH 6.7.
Water q.s., 100 ml.

We claim:
1. A compound selected from the group consisting of benzodiazepines of the structural formula

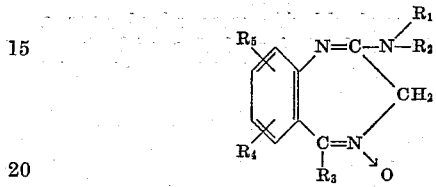

wherein:

R₁ represents a member of the group consisting of lower alkanoyl, cyanoethyl, carboxyethyl, carbo-lower alkoxyethyl, and alkali metal carboxyethyl, R₂ represents a member of the group consisting of hydrogen and lower alkyl, R₃ represents a member of the group consisting of phenyl, mono-halophenyl, mono-lower alkylphenyl, and mono-lower alkoxyphenyl, and R₄ and R₅ each represents a member of the group consisting of hydrogen, halogen and lower alkyl, and pharmaceutically acceptable acid addition salts of the basic benzodiazepines.

2. A compound of the structural formula

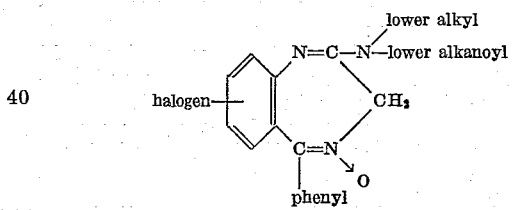

3. A compound of the structural formula

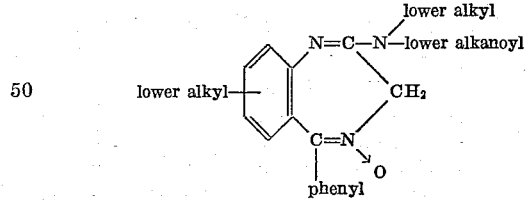

4. 7-chloro-2-(N-methylacetamido)-5-phenyl-3H-1,4-benzodiazepine 4-oxide.

5. 7-chloro-2-(N-methylpropionamido)-5-phenyl-3H-1,4-benzodiazepine 4-oxide.

6. 7-chloro-2-acetamido-5-phenyl-3H-1,4-benzodiazepine 4-oxide.

7. 7,8-dimethyl-2-(N-methylacetamido)-5-phenyl-3H-1,4-benzodiazepine 4-oxide.

8. 7-methyl-2-(N-methylacetamido)-5-phenyl-3H-1,4-benzodiazepine 4-oxide.

References Cited in the file of this patent

UNITED STATES PATENTS

| | | |
|---|---|---|
| 2,231,067 | Hammond | Feb. 11, 1941 |
| 2,893,992 | Sternbach | July 7, 1959 |

OTHER REFERENCES

Grant: Hackh's Chemical dictionary, p. 116 (1944).